(12) United States Patent
Kopser et al.

(10) Patent No.: US 6,338,125 B1
(45) Date of Patent: Jan. 8, 2002

(54) DYNAMIC SLOT ALLOCATION AND TRACKING OF MULTIPLE MEMORY REQUESTS

(75) Inventors: Andrew S. Kopser; Robert L. Alverson, both of Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,185

(22) Filed: Dec. 23, 1998

(51) Int. Cl.[7] .............................................. G06F 13/00
(52) U.S. Cl. ....................... 711/150; 711/154; 711/156; 711/168; 711/151; 711/158; 710/39; 710/52; 710/112
(58) Field of Search ................................ 711/5, 2, 170, 711/172, 173, 147, 148, 150, 158, 151, 168; 709/104, 105; 710/15, 16, 17, 18, 19, 13, 39, 52, 112

(56) References Cited

U.S. PATENT DOCUMENTS

| | | | |
|---|---|---|---|
| 4,891,788 A | 1/1990 | Kreifels ........................ | 365/49 |
| 5,623,628 A | 3/1994 | Brayton et al. ............. | 711/141 |
| 5,594,875 A | 7/1994 | Thaller ........................ | 710/107 |
| 5,659,707 A | 10/1994 | Wang et al. ................. | 711/145 |
| 5,974,511 A | * 10/1999 | Boddu et al. ............... | 711/146 |
| 6,070,231 A | * 5/2000 | Ottinger ...................... | 711/141 |
| 6,134,635 A | * 10/2000 | Reams ........................ | 711/150 |

OTHER PUBLICATIONS

Gail Alverson et al., "Tera Hardware–Software Corporation", in *Proceedings of Supercomputing*, Nov. 1997.

Gail Alverson et al., "Scheduling on the Tera MTA" in Job Scheduling Strategies for Parallel Processing, 949:of Lecture Notes in Computer Science, Springer–Verlag, 1995.

(List continued on next page.)

*Primary Examiner*—Do Hyun Yoo
*Assistant Examiner*—Jasmine Song
(74) *Attorney, Agent, or Firm*—Seed IP Law Group PLLC; David V. Carlson

(57) ABSTRACT

A microprocessor having a logic control unit and a memory unit. The logic control unit performs execution of a number of instructions, among them being memory operation requests. A memory operation request is passed to a memory unit which begins to fulfill the memory request immediately. Simultaneously with the memory request being made, a copy of the full memory request is made and stored in a storage device within the memory unit. In addition, an identification of the request which was the origin of the memory operation is also stored. In the event the memory request is fulfilled immediately, whether it be the retrieval of data or the storing of data, the results of the memory request are provided to the microprocessor. On the other hand, in the event the memory is busy and cannot fulfill the request immediately, the memory unit performs a retry of the memory request on future memory request cycles. The microprocessor is able to perform the execution of additional instructions and other operations without having to be concerned about the memory request because the memory unit contains a duplicate of the memory request and will continue to perform and retry the memory request until it is successfully completed. This significantly increases overall microprocessor operation and throughput of instruction sets.

14 Claims, 1 Drawing Sheet

OTHER PUBLICATIONS

Robert Alverson et al., "The Tera Computer System", in Proceedings of 1990 ACM International Conference on Supercomputing, pp. 1–6, Jun. 1990.

D.H. Bailey et al., "The NAS Parallel Benchmarks—Summary and Preliminary Results", in Proceeding of Supercomputing '91, pp. 158–165, Nov. 1991.

David Callahan, Recognizing and Parallelizing Bounded Recurrences, in Languages and Compilers for Parallel Computing, 589:of Lecture Notes in Computer Science, pp. 169–185, Springer–Verlag, 1992.

David Callahan et al., "Improving Register Allocation for Subscripted Variables", in Proceedings of the ACM SIG PLAN '90 Conference on Programming Language Design and Implemantation, SIGPLAN Notices, 25(6):53–65, Jun. 1990.

David Callahan and Burton Smith, "A Future–based Parallel Language For a General–purpose Highly–parallel Computer", in Languages and Compilers for Parallel Computing, pp. 95–113, 1990.

Mark Linton, "The Evolution of Dbx", in USENIX Summer Conference, 1990.

Roy F. Touzeau, "A Fortran Compiler for the FPS–164 Scientific Computer", in Proceedings of the ACM SIG-PLAN '84 Symposium on Compiler Construction, SIGPLAN Notices 19(6):48–57, Jun. 1984.

* cited by examiner

DYNAMIC SLOT ALLOCATION AND TRACKING OF MULTIPLE MEMORY REQUESTS

TECHNICAL FIELD

This invention relates to a system for processing many memory requests simultaneously and in particular, a method and apparatus that receives many memory requests and tracks each request while providing a response as quickly as possible.

BACKGROUND OF THE INVENTION

Microprocessors have increased in clock speed in recent years. Only a few years ago, clock speeds in the kilohertz range for a microprocessor were considered high performance. Recently, standard microprocessors as used in consumer computers have reached speeds in excess of 3–400 megahertz. The processing speed of supercomputers has increased even more dramatically.

Supercomputers today often process data with clock cycles in the gigahertz and terahertz range. Unfortunately, access to memory has not increased in speed as quickly as microprocessor speeds. When a microprocessor desires to perform a memory operation, it takes a large number of clock cycles, often in excess of 100, before the memory operation can be completed. There are some systems in which the microprocessor waits until completion of the memory operation before performing subsequent operations. This, however, is not efficient use of microprocessor cycle time, which has the capability to perform many operations more quickly than a memory operation.

SUMMARY OF THE INVENTION

According to principles of the present invention, a memory unit is provided for tracking memory operation requests from a microprocessor. The memory unit stores an identification of the source of the memory request as well as the type of memory operation being requested. A tag provides the information identifying the source of the memory request. The tag, along with other information is stored in the slot control register for identifying the source of the memory request and tracking the fulfilling of the request and returning the results to the microprocessor.

The slot number is used to index slot control register and a memory request storage which contains a duplicate copy of the memory request. The slot state, also indexed by slot number, contains an identification of the status of the request. The slot state tracks the status of the request; whether it is outstanding, whether to perform a retry in the future, whether the slot is available for use by a new memory operator, or other types of information associated with the pending request. When the reply to an outstanding request is a busy, the slot state is updated and will perform a retry on future clock cycles. A retry is performed along with performing newly received memory requests. As soon as an outstanding request is filled, whether from a newly received request, or a retry of a request, results are provided back to the microprocessor and the slot state is changed to empty indicating it is ready for future memory requests.

A significant advantage of the present invention is that the memory unit is able to perform its function of memory operations and retrieval while letting the central microprocessor perform its job of instruction execution simultaneously. The memory unit runs requests under its own control and provides the requested memory results to the central processor within acceptable time limits for the microprocessor so that the microprocessor can perform other tasks without having to use clock cycles to repeat memory requests. The memory unit reply cycle is not synchronized with the CPU request cycle so that each can operate independently in performing the allocated tasks. This significantly increases the speed at which the overall system can operate both in executing logic and control operations, memory operations and most importantly, increases the speed at which operations requiring memory and arithmetic interaction can occur.

DETAILED DESCRIPTION OF THE INVENTION

A microprocessor 10 includes, at least two distinct sections, a logic and control operation unit 12 and a memory unit 14. The logic and control is the heart of the microprocessor. It executes instructions and carries out a number of operations, including arithmetic operations, logic operations and other control functions. The microprocessor according to the present invention is a high speed versatile processor of the type used in a supercomputer. It can, for example, have up to 128 streams of instructions being processed simultaneously with each other. In addition, each of the 128 streams can process a number of operation requests simultaneously. In one example, each string can request the performance of a large number of memory operations while a previous memory operation is still pending.

A pending memory operation may include storing data in a selected location in memory, reading from a known location in memory, or the like. To the microprocessor, a read is termed a load operation, namely the read request causes certain data to be loaded into a given register within the microprocessor's control so that it may perform operations on the data. When the microprocessor requests a memory operation, such as a load or a store, it is necessary for the operation to be carried out, so that the microprocessor may be prepared to use the results when needed on future instruction cycles. The present invention permits such memory operations to be carried out without consuming additional resources of the microprocessor clock as will now be explained.

Figure 1:
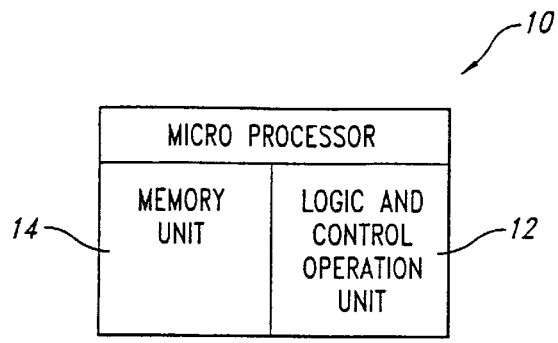
FIG. 1 is a block diagram of a microprocessor according to the present invention.
Figure 2:
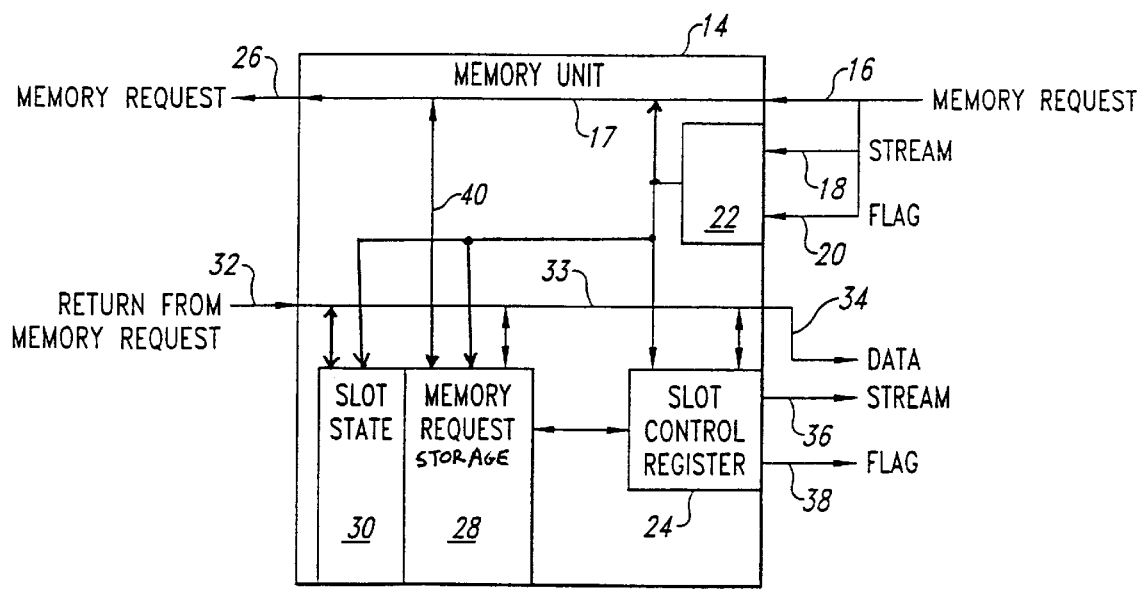
FIG. 2 is a block diagram of the memory unit of FIG. 1 according to he present invention.

FIG. 2 is a schematic of the memory unit according to the present invention. The memory unit 14 receives a memory operation request 16 from the microprocessor 10. The memory operation request may be of at least two types, and in some instances there may further types within these types. For example, one request may be a load, which has the meaning of performing a read of data in memory and returning the results of that read for use by the microprocessor. Within the memory operation of load, there are different types of loads such as a normal load which retrieves data from an identified location, a future load which retrieves the data from an identified location which has been confirmed as full, or a synch load which, while it is similar to a future load in that it obtains data only from a location which has been confirmed full, upon obtaining the data it automatically switches the memory location to empty. The synch load has some advantages in many applications which need not be discussed here. However, it is desirable in some applications for the microprocessor, and thus for the memory unit, to keep track of whether the load was of the type that was a normal load, a future load, synch load or some other type of load of the various types which can be performed. Also, the memory operation request may be a store, specifically, to store the results of a computation in a particular memory location. The store may also have various types, such as a normal, a future store, a synch store or other type whose symanties are complementary to those of the load. A store is also a time consuming task. It is preferred to have the microprocessor return to the execution of other tasks without having to use additional clock cycles to track whether the store has in fact yet occurred.

Associated with each memory operation request is also the source from which the request came. In the present invention, the microprocessor can have up to 128 streams operating simultaneously at any one time. Further, each one of these streams has the capability of making up to eight memory requests while current requests are still pending.

Referring now to FIG. 2, an identification of the stream which made the request is provided on line 18 and a flag identifying which request it is within the stream is provided on line 20. The stream request line is, in the present embodiment, a 7 bit line and the flag is a 3 bit line, 7 and 3 bits being required respectively to uniquely identify one stream of 128 and one request from eight. The combination of the stream code and the flag code are organized together as a 10 bit tag by block 22 within the memory unit. The slot allocation block 22 allocates a slot and associates it with a tag. The block 22 is then prepared to create additional slot allocations for updating the slot control register 24 as well as slot state 30 and memory request storage 28. The slot allocation block 22 provides the tag to register 24, memory request storage 28 and slot state 30.

Slot control 24 is a register which stores at all times the tag for each outstanding memory operation which has been requested by the microprocessor 10.

Simultaneously with the creation of the slot in block 22 and the storage of the tag in the slot control register 24, the memory operation request is processed on line 17 through the memory unit to perform the memory request at output 26. The memory request itself is therefore passed extremely quickly through the memory unit 14 so that the request can begin to be filled immediately. The slot number is provided out on bus 17 as part of the memory request. It can therefore be returned with the results of the request. When the memory operation request is made, it is also stored in a memory request storage 28. The entire memory request is stored in the memory request storage 28 so that the microprocessor itself no longer needs to keep track of what request was made, or even which stream or instruction within the stream made the request. A complete duplicate of the entire memory operation request has been stored in the memory request storage 28 and, an identifier of the source of the request had been stored in slot control register 24. The microprocessor is thus freed to return to the execution of subsequent tasks without having to be concerned with tracking the results of the memory requests or waiting for them to be filled. Of course, the subsequent tasks should be of a type which do not rely on the completion of the outstanding memory requests. This can be provided by appropriate selection of the next instructions to be carried out, the sequence of instructions and tracking such instructions, which features need not be discussed in detail herein because they do not relate to the subject matter of the present invention but are described in a co-pending application.

Simultaneously with storing the memory request in the memory request storage 28, the state of such request is also stored in the slot state register 30 which is part of the memory request storage 28. The slot state 30 keeps track of the state of any memory operation request which has been stored in the memory storage 28. Each of the block 24, 28 and 30 are indexed by the same slot number. When an operation is performed, such as a request or a completion, each of these can be quickly addressed by the same index code.

The state of the request is based on the results of a request made on line 26. When the request is initially made, the memory state is stored as being outstanding. This means that the memory request has been made and the results of the request are pending and have not yet been reported to the memory unit 14 on line 32. An attempt is made immediately to complete the memory request as made in line 26. If the attempt is not successful, a return is provided in line 32 indicating that the memory request has not yet been completed. This generally is in the form of the a slot number and a busy signal indicating that the memory to which access is being requested is not currently available for accessing. Such a busy signal can be received in instances where another memory request, possibly from a different stream or a different microprocessor is attempting to access the very same memory to perform, for example, a store or read. Or, it may result if the memory location is not full, which will be the case if the data sought to be read from the memory is not yet stored in the indicated location. This may be because a previous instruction has not yet been completed. In this instance, the data location is not yet full and the memory request cannot be completed until the data location is full. Another possible response from the memory request in line 32 is completed, namely the memory request has been performed. When the memory request has been completed, the results of the memory request are provided on line 32. The results are passed on line 32 to the slot control register 24 which matches the memory request to the tag with which it is associated. The results of the memory request are then provided on line 34, together with the stream on line 36 and the flag on line 38, which were the source of the memory request. The microprocessor 10 can then receive the memory request, together with an identification of the source of the request and can perform further instructions on the data which has now been received.

The return from the memory request 32 may include more than the data or information instead of the date. For example, the return on bus 32 may include the slot number of a particular memory request. It may also include the results of the request, such as busy, pending, etc. The signal returned on bus 32 thus provides an index to the memory unit 14 and can be used in a number of ways even when the request is not yet completed. When the request is completed, the data (if it was a load) is returned on bus 32, along with other information, such as the slot number. This is used to allocate that slot in the various parts of the memory unit and the data itself is provided out on line 34. Along with the date, the stream and flag (which is the tag) are provided as well.

In the event the line 32 returns a busy signal from the memory operation which has been requested, the slot state register 30 stores a retry as the status of the memory request. On the next available clock cycle that is not being occupied by an outstanding memory request, a retry is performed on a memory request stored in the memory storage 28 for which the state is a retry. The memory storage 28 contains a full copy of all the pending memory operations which have been requested. Accordingly, it outputs via line 40 to bus 17 for output on line 26 a memory request. The memory request on line 26 is viewed by the system as an original memory operation request since coming from the memory storage 28 is all of the information which is part of an original memory operation request from the microprocessor 10. The memory therefore treats the request as an original memory request and makes an attempt to execute the request, changing the state of the request to outstanding. While the memory is attempting to execute this request, additional memory requests from the microprocessor may be received on line 16 or, if an open cycle is available on bus 17, the memory request storage 28 will examine whether there are any other requests having a retry state in the register 30 and if so, will place these on bus 17 for output as a memory request on line 26. The memory request storage 28 continues to process memory requests whenever a cycle becomes available on bus 17 so that a retry is performed whenever a cycle has become available on the bus 17. The retry of memory requests is done under control of the slot state 30 without the microprocessor 10 having to track, or even be aware that such functions are being performed on its behalf. Instead, the microprocessor is free to perform additional instructions while numerous retries may be made on a number of memory requests and, as soon as a retry results in a successful memory operation the results are provided via line 34 as transmitted along internal bus 33 as previously described.

Upon completion of the memory request, the slot state 30 has a state of empty stored therein which releases its associated line in the memory request storage 28 to receive and store subsequent requests as received on memory request line 16. In addition, upon the request being fulfilled, the slot control register 24 outputs the matching tag with the data and no longer stores the tag. The register is then available to store subsequent tags as they are received from the slot allocation 22.

According to one example of a memory unit 14, the memory request storage 28 can be any desired size of RAM. It can be sized to store only a few memory requests, such as 32 or 64, or, on the other hand, it can be larger and sized to store 2056 or many more memory requests as desired. You can have as many slots as you have tags. In one example the memory request has 384 separate words. In another example, it has 1024 separate words. Namely, it can keep track of and simultaneously store memory references of up to 384 pending memory operations. The slot state register 30 which is part of the memory request storage 28 has a state associated with each of the 384 pending operations within the memory request storage 28. Slot state 30 thus stores such data as the state of the memory request, whether outstanding, empty, whether a retry waiting, or a retry variant. Two bits would be required to store one of the four different states and thus the slot state register 30 can be composed of 2 bits in one embodiment.

In addition, the memory request storage 28 may include the memory operation code which identifies the type of action being taken. The actions being taken may include such things as a normal load meaning get data from a location and return the value; a future load meaning get data only from a location identified as full and return the data while leaving a location full with the same data; and a synchronization load meaning get data from a location which is confirmed as full and switch the location to empty. Other types of loads may also be performed in different systems if desired. The operation type may also be a store meaning store specific data at a location in memory. Likewise, the store can be a normal, future, synch or the like. In this situation, the identity of the data to be stored is also stored within the memory request storage 28 so that it contains a full set of all the information needed to carry out the memory operation request without further interaction with the microprocessor 10.

Slot control register 24 indexed by the slot number may include the tag which is a 7 bit string identifying marker as well as a 3 bit flag marker. In another embodiment the number of slots is equal to the number of tags so the slot allocation block 22 and slot control register 24 are not needed since the tag number is the same as the slot number. The slot state is instead a retry storage that is an ordered list of slots, namely memory requests, that need to be retried.

According to one embodiment of the present invention, the memory unit 14 also ensures that the memory storage 28 is not overloaded with more requests than it can store and also performs a retry of the request which has not yet been fulfilled on a regular basis.

The memory unit provides an output signal back to logic unit 12 when a slot is allocated and de-allocated. To avoid overflowing the memory request storage 28, the logic unit 12 confirms that slots are still available when a request is sent. In the event all the number of slots used approaches a certain point, the logic unit 12 will reduce the number of memory requests to the memory unit 14 so it will not overflow.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An apparatus for tracking memory requests, the apparatus comprising:
   an input line providing a first memory operation request and a second subsequent memory operation request to a memory control unit;
   a memory request bus receiving the first and second memory operation requests;
   a memory request output line from the memory control unit to a memory;
   a slot control register storing the source of each memory operation request;
   a memory request storage connected to the memory request bus and responsive to the slot control register, the memory request storage storing a copy of each of the requested first and second memory operations;
   a retry flag portion of the memory request storage having a first retry flag being set while the first memory operation request is pending and a second retry flag being set while the second memory operation request is pending; and
   a connection from the memory request storage to the memory request output line for outputting the copy of each of the first and second memory operation requests in storage on the memory request output line while the respective first and second retry flag is set.

2. The apparatus according to claim 1 further including:
   a receiving bus coupled to the memory control unit for receiving the response to the memory request; and
   an output line from the memory control unit providing the results of the memory operation.

3. The apparatus according to claim 1 further including:
   a slot state register as part of the memory request storage for storing the state of a memory request.

4. The apparatus according to claim 3 wherein the state of the memory request may be a retry or an outstanding.

5. The apparatus according to claim 1 further including:

a slot allocation block for creating an identification tag of the source of the memory request.

6. The apparatus according to claim 1 wherein the slot control block, slot state register and memory request storage are all indexed by the same tag number.

7. The apparatus according to claim 1 wherein the tag is returned as an output with the data, the tag providing an identification of the source of the memory request.

8. A method of tracking and performing memory requests comprising:

receiving a first and a second successive memory request from a microprocessor;

outputting the first and second memory requests a first time to a memory circuit to perform the first and second memory requests;

copying the first and second memory requests to a memory request storage prior to the requests being output;

receiving results of the first memory request from the memory circuit;

providing the results of the first memory request back to the microprocessor if the first memory request has been completed;

setting a retry flag in the memory request storage if the first memory request has not yet been completed;

receiving results of the second memory request from the memory circuit;

providing the results of the second memory request back to the microprocessor if the second memory request has been completed;

setting a retry flag in the memory request storage if the second memory request has not yet been completed;

outputting the first memory request a second time to the memory circuit, the output coming from the memory request storage in the event the retry flag in the storage is set; and outputting the second memory request a second time to the memory circuit, the output coming from the memory request storage in the event the retry flag in the storage is set.

9. The method according to claim 8 further comprising:

repeating the outputting step from the memory request storage until the request is completed; and clearing the entry from the memory request storage once the request has been completed.

10. The method according to claim 8 further including:

creating a tag for a memory request when it is received;

allocating a slot to each tag when it is received; and de-allocating the slot when the memory request is filled.

11. A device receiving memory requests from a microprocessor and outputting the received memory requests to a memory circuit, the device comprising:

a memory request receiving means for receiving a first and a second successive memory request from a microprocessor;

a copying means coupled to the memory request receiving means for copying the first and second memory requests to a memory request storage;

a memory request outputting means coupled to the memory request receiving means for outputting the first and second memory requests to a memory circuit to perform the first and second memory requests, and coupled to the memory request storage for outputting to the memory request circuit the copied first memory request from the memory request storage if a first retry flag in the storage is set and for outputting to the memory request circuit fine copied second memory request from the memory request storage if a second retry flag in the storage is set;

a result receiving means coupled for receiving results of the first and second memory requests from the memory circuit;

a result outputting means for outputting the results of the first and second memory requests to the microprocessor, the result outputting means outputting the results of the first memory request to the microprocessor if the first memory request has been completed, and outputting the results of the second memory request to the microprocessor if the second memory request has been completed; and a flag setting means coupled to the result receiving means for setting the first retry flag in the memory request storage if the first memory request is not completed, and setting the second retry flag in the memory request storage if the second memory request is not completed.

12. The device of claim 11 wherein the memory request outputting means is structured to repeatedly output the first and second memory requests to a memory circuit while the respective first and second retry flags are set.

13. The device of claim 12 further comprising clearing means coupled to the memory request storage for clearing the copied first and second memory requests when the respective first and second retry flags are not set.

14. The device of claim 12 further comprising a slot control register means coupled to the memory request receiving means for creating a tag for a memory request when the memory request is received, allocating a slot to each tag when the tag is received, and de-allocating the slot when a retry flag corresponding to the memory request is not set.

* * * * *